(12) United States Patent
Shih

(10) Patent No.: US 10,310,225 B2
(45) Date of Patent: Jun. 4, 2019

(54) WIDE-ANGLE LENS

(71) Applicants: AOE OPTRONICS (SHENZHEN) CO., LTD., Shenzhen, Guangdong Province (CN); AOE OPTRONICS CO., INC., Taichung (TW)

(72) Inventor: Po-Yuan Shih, Taichung (TW)

(73) Assignees: AOE OPTRONICS (SHENZHEN) CO., LTD., Shenzhen, Guandong Province (CN); AOE Optronics Co., Inc., Taichung (TW)

( * ) Notice: Subject to any disclaimer, the term of this patent is extended or adjusted under 35 U.S.C. 154(b) by 0 days.

(21) Appl. No.: 15/431,806

(22) Filed: Feb. 14, 2017

(65) Prior Publication Data

US 2017/0248775 A1  Aug. 31, 2017

(30) Foreign Application Priority Data

Feb. 26, 2016  (CN) .......................... 2016 1 0109740

(51) Int. Cl.
    *G02B 9/64* (2006.01)
    *G02B 13/00* (2006.01)
    *G02B 13/06* (2006.01)

(52) U.S. Cl.
    CPC .......... *G02B 13/0045* (2013.01); *G02B 9/64* (2013.01); *G02B 13/009* (2013.01); *G02B 13/06* (2013.01)

(58) Field of Classification Search
    CPC .... G02B 13/0045; G02B 9/64; G02B 13/009; G02B 13/06; G02B 13/02; G02B 13/04; G02B 9/00

USPC ....... 359/745, 750, 754, 680–681, 749, 751, 359/755
See application file for complete search history.

(56) References Cited

U.S. PATENT DOCUMENTS

| 4,711,533 A * | 12/1987 | Saito ...................... G02B 15/14 359/681 |
| 2010/0027136 A1* | 2/2010 | Ohashi ................... G02B 13/04 359/753 |
| 2011/0205637 A1* | 8/2011 | Wei ....................... G02B 15/177 359/691 |

(Continued)

FOREIGN PATENT DOCUMENTS

CN    104007535 A    8/2014

*Primary Examiner* — Evan P Dzierzynski
*Assistant Examiner* — Alberto J Betancourt
(74) *Attorney, Agent, or Firm* — McClure, Qualey & Rodack, LLP

(57) ABSTRACT

A wide-angle lens includes a first lens, a second lens, a third lens, a fourth lens, a fifth lens, a sixth lens, a seventh lens and an eighth lens, all of which are arranged in sequence from an object side to an image side along an optical axis. The first lens is a convex-concave lens with negative refractive power and includes a convex surface facing the object side and a concave surface facing the image side. The second lens is a biconcave lens with negative refractive power. The third lens is a biconvex lens with positive refractive power. The fourth lens includes a convex surface facing the object side. The fifth lens is with positive refractive power and includes a convex surface facing the image side. The sixth lens is a biconvex lens with positive refractive power. The seventh lens is a biconcave lens with negative refractive power. The eighth lens is a biconvex lens with positive refractive power.

19 Claims, 12 Drawing Sheets

(56) References Cited

U.S. PATENT DOCUMENTS

| | | | | |
|---|---|---|---|---|
| 2011/0205638 A1* | 8/2011 | Wei | ............... | G02B 15/177 |
| | | | | 359/691 |
| 2013/0235465 A1* | 9/2013 | Arimoto | ............ | G02B 13/04 |
| | | | | 359/680 |
| 2014/0307329 A1* | 10/2014 | Katakura | ............ | G02B 13/04 |
| | | | | 359/664 |
| 2015/0015956 A1* | 1/2015 | Kim | ............... | G02B 15/177 |
| | | | | 359/557 |
| 2016/0334609 A1* | 11/2016 | Lee | ............... | G02B 15/177 |

* cited by examiner

WIDE-ANGLE LENS

BACKGROUND OF THE INVENTION

Field of the Invention

The invention relates to a lens, and more particularly to a wide-angle lens.

Description of the Related Art

In recent years, depending on different applications of needs, wide-angle lens not only has been gradually developed toward miniaturization and larger field of view, but also has been gradually developed toward high resolution and ability of resistance to environmental temperature changes. However, the conventional wide-angle lens has been unable to meet demand, and we need another new structure of the wide-angle lens, and that can meet the miniaturization, larger field of view, high resolution and ability of resistance to environmental temperature changes.

BRIEF SUMMARY OF THE INVENTION

The invention provides a wide-angle lens to solve the above problems. The wide-angle lens is provided with characteristics of a larger field of view, miniaturization, high resolution and ability of resistance to environmental temperature changes.

The wide-angle lens in accordance with the invention, in sequence from an object side to an image side along an optical axis, comprises a first lens; a second lens including a concave surface facing the object side and having negative refractive power; a third lens having positive refractive power; a fourth lens including a convex surface and facing the object side; a fifth lens having positive refractive power; a sixth lens having positive refractive power; a seventh lens having negative refractive power, and an eighth lens having positive refractive power.

In accordance with the invention, the first lens is a meniscus lens and has negative refractive power and includes a convex surface facing the object side and a concave surface facing the image side; the second lens is a biconcave lens; the third lens, the sixth lens and the eighth lens at least one is a biconvex lens; the fifth lens includes a convex surface facing the image side; the seventh lens is a biconcave lens; the fourth lens and the fifth lens are cemented to form a cemented lens; the sixth lens and the seventh lens are cemented to form a cemented lens; a stop is interposed between the third lens and the fourth lens; or the surfaces of the second lens, the third lens, the fourth lens, the fifth lens, the sixth lens, the seventh lens and the eighth lens at least one is an aspheric surface.

In accordance with the invention, the fourth lens satisfies the following condition: $-20 \leq f_4/f \leq 20$, wherein f4 is an effective focal length of the fourth lens, f is an effective focal length of the wide-angle lens.

In accordance with the invention, the sixth lens and the seventh lens satisfies the following condition: $-30 \leq f_{67}/f \leq -5$, wherein $f_{67}$ is an effective focal length of a cemented lens that is cemented the sixth lens and the seventh lens, f is an effective focal length of the wide-angle lens.

In accordance with the invention, the fourth lens satisfies the following condition: $5 \leq Vd_4/Nd_4 \leq 50$, wherein $Vd_4$ is an Abbe number of the fourth lens, $Nd_4$ is a refractive index of the fourth lens.

In accordance with the invention, the seventh lens satisfies the following condition: $-110 \leq (R_{71}-R_{72})/(R_{71}+R_{72}) \leq -1$, wherein $R_{71}$ is a radius of curvature of the object side of the seventh lens, $R_{72}$ is a radius of curvature of the image side of the seventh lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
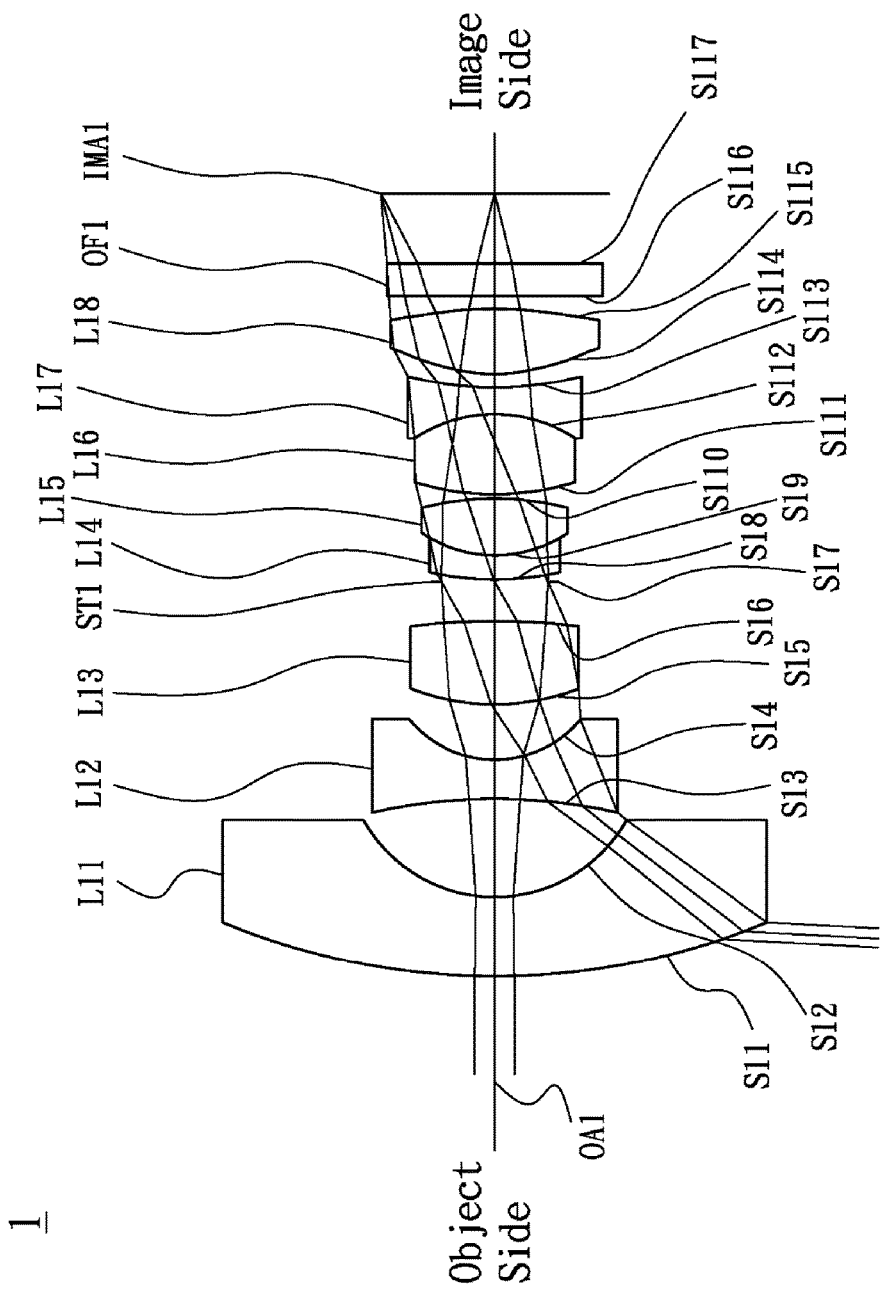
FIG. 1 is a lens layout and optical path diagram of a wide-angle lens in accordance with a first embodiment of the invention.

Referring to FIG. 1, FIG. 1 is a lens layout and optical path diagram of a wide-angle lens 1 in accordance with a first embodiment of the invention. The wide-angle lens 1, in sequence from an object side to an image side along an optical axis OA1, comprises a first lens L11; a second lens L12 including a concave surface facing the object side and having negative refractive power; a third lens L13 having positive refractive power; a fourth lens L14 including a convex surface and facing the object side; a fifth lens L15 having positive refractive power; a sixth lens L16 having positive refractive power; a seventh lens L17 having negative refractive power, and an eighth lens L18 having positive refractive power.

In the first embodiment of the wide-angle lens 1, the first lens L11 is made of glass material and with negative refractive power. The first lens L11 is a meniscus lens and the object side S11 of the first lens L11 is a spherical convex surface, and the image side S12 of the first lens L11 is a spherical concave surface. The second lens L12 is made of glass material and with negative refractive power. The second lens L12 is a biconcave lens and has an object side surface S13 and an image side surface S14, and both of which are aspherical. The third lens L13 is made of glass material and with positive refractive power. The third lens L13 is a biconvex lens and has an object side surface S15 and an image side surface S16, and both of which are spherical. The fourth lens L14 is made of glass material and with negative refractive power. The fourth lens L14 is a meniscus lens and the object side S18 of the fourth lens L14 is a spherical convex surface, and the image side S19 of the fourth lens L14 is a spherical concave surface. The fifth lens L15 is made of glass material and with positive refractive power. The fifth lens L15 is a biconvex lens and has an object side surface S19 and an image side surface S110, and both of which are spherical. The image side S19 of the fourth lens L14 and the object side S19 of the fourth lens L15 are cemented to form the surface S19. In other words, the fourth lens L14 and the fifth lens L15 are cemented to form a cemented lens. The sixth lens L16 is made of glass material and with positive refractive power. The sixth lens L16 is a biconvex lens and has an object side surface S111 and an image side surface S112, and both of which are spherical. The seventh lens L17 is made of glass material and with negative refractive power. The seventh lens L17 is a biconcave lens and has an object side surface S112 and an image side surface S113, and both of which are spherical. The image side S112 of the sixth lens L16 and the object side S112 of the seventh lens L17 are cemented to form the surface S112. In other words, the sixth lens L16 and the seventh lens L17 are cemented to form a cemented lens. The eighth lens L18 is made of glass material and with positive refractive power. The eighth lens L18 is a biconvex lens and has an object side surface S114 and an image side surface S115, and both of which are spherical. The optical filter OF1 has an object side surface S116 and an image side surface S117, and both of which are plane.

In addition, the wide-angle lens 1 of the first embodiment at least satisfies one of the following conditions:

$$-110 \leq (R1_{71}-R_{72})/(R1_{71}+R1_{72}) \leq -1 \quad (1)$$

$$-20 \leq fl_4/fl \leq 20 \quad (2)$$

$$-30 \leq fl_{67}/fl \leq 5 \quad (3)$$

$$5 \leq Vd1_4/Nd1_4 \leq 50 \quad (4)$$

Wherein $R1_{71}$ is a radius of curvature of the object side S112 of the seventh lens L17, $R1_{72}$ is a radius of curvature of the image side S113 of the seventh lens, $fl_4$ is an effective focal length of the fourth lens L14, $fl$ is an effective focal length of the wide-angle lens 1, $fl_{67}$ is an effective focal length of a cemented lens that is cemented the sixth lens L16 and the seventh lens L17, $Vd1_4$ is an Abbe number of the fourth lens L14, $Nd1_4$ is a refractive index of the fourth lens L14.

Due to the above design of the lenses and stop ST1, the wide-angle lens 1 is provided with characteristics of a larger field of view, miniaturization, high resolution and ability of resistance to environmental temperature changes.

Referring to TABLE 1, the optical specifications of the wide-angle lens 1 of the first embodiment. TABLE 1 shows that the effective focal length (f1), F-number, field of view (FOV) and total track length (TTL) is equal to 1.8288 mm, 2.0, 174.3° and 17.625 mm.

TABLE 1

Effective Focal Length (f1) = 1.8288 mm F-number = 2.0
FOV = 174.3° TTL = 17.625 mm

| Surface | Radius of Curvature (mm) | Thickness (mm) | Nd | Vd | Remark |
|---|---|---|---|---|---|
| S11 | 15.703 | 1.800 | 1.744 | 44.9 | The first lens L11 |
| S12 | 3.386 | 2.206 | | | |
| S13 | −10.216 | 0.882 | 1.589 | 61.2 | The second lens L12 |
| S14 | 2.508 | 1.246 | | | |
| S15 | 5.349 | 1.878 | 1.760 | 40.0 | The third lens L13 |
| S16 | −15.141 | 0.882 | | | |
| S17 | ∞ | 0.050 | | | Stop ST1 |
| S18 | 6.364 | 0.544 | 1.652 | 58.6 | The fourth lens L14 |
| S19 | 2.897 | 1.280 | 1.584 | 59.7 | The fifth lens L15 |
| S110 | −6.333 | 0.100 | | | |
| S111 | 6.233 | 1.788 | 1.610 | 60.2 | The sixth lens L16 |
| S112 | −3.320 | 0.606 | 1.847 | 23.8 | The seventh lens L17 |
| S113 | 7.624 | 0.318 | | | |
| S114 | 3.947 | 1.467 | 1.589 | 61.2 | The eighth lens L18 |
| S115 | −7.986 | 0.286 | | | |
| S116 | ∞ | 0.735 | 1.517 | 64.2 | Optical filter OF1 |
| S117 | ∞ | 1.557 | | | |

The aspheric surface sag z of each lens in TABLE 1 can be calculated by the following formula:

$$z = ch^2/\{1+[1-(k+1)c^2h^2]^{1/2}\}+Ah^4+Bh^6+Ch^8+Dh^{10}$$

wherein c is curvature, h is the vertical distance from the lens surface to the optical axis, k is conic constant and A, B, C and D are aspheric coefficients.

In the wide-angle lens 1 of the first embodiment, the conic constant k and the aspheric coefficients A, B, C and D of each surface are shown in TABLE 2.

TABLE 2

| Surface | S13 | S14 | S114 | S115 |
|---|---|---|---|---|
| K | 0.0000E+00 | 0.0000E+00 | 0.0000E+00 | 0.0000E+00 |
| A | 2.1603E−03 | 3.3354E−03 | −8.0174E−03 | 3.0288E−03 |
| B | −1.9878E−04 | −8.4488E−04 | 9.7297E−04 | 2.4577E−04 |
| C | 3.0145E−05 | 0.0000E+00 | −1.5844E−05 | −4.3679E−05 |
| D | 0.0000E+00 | 0.0000E+00 | 7.8031E−06 | 1.4055E−06 |

For the wide-angle lens 1 of the first embodiment, the $R1_{71}$ is −3.32024 mm, the $R1_{72}$ is 7.62421 mm, the $fl_4$ is −8.6650 mm, the f1 is 1.8288 mm, the $fl_{67}$ is −15.24650 mm, the $Vd1_4$ is 58.6 and the $Nd1_4$ is 1.652. According to the above data, the following values can be obtained: $(R1_{71}-R1_{72})/(R1_{71}+R1_{72})=-2.543$, $fl_4/f1=-4.738$, $fl_{67}/f1=-8.337$ and $Vd1_4/Nd1_4=35.451$, which satisfy the above condition (1)-(4).

Figure 2A:
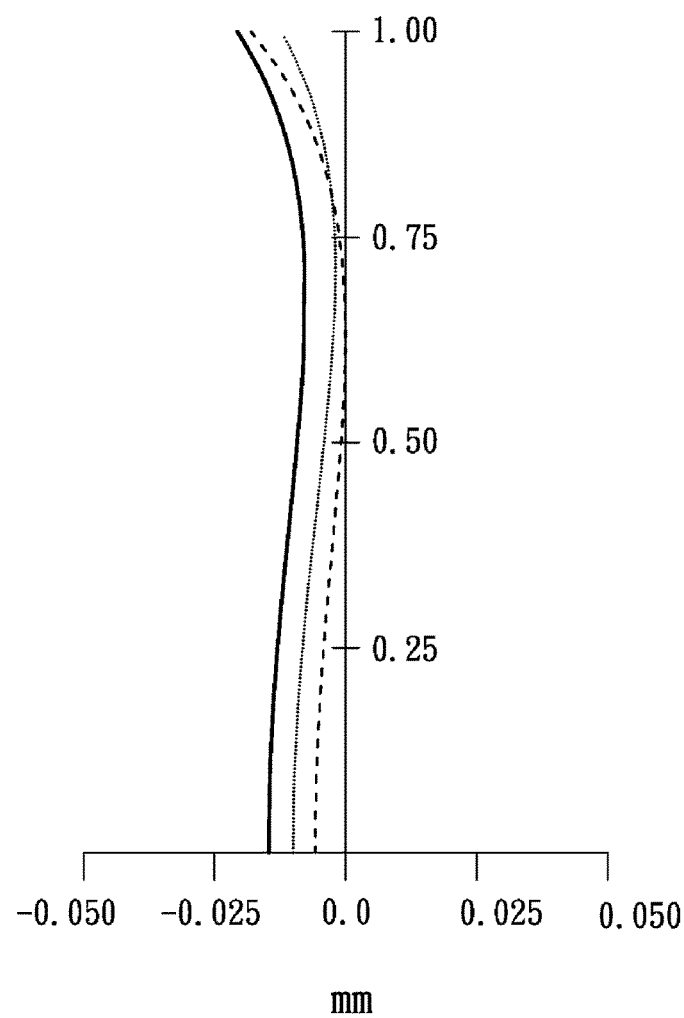
FIG. 2A is a longitudinal spherical aberration diagram of a wide-angle lens in accordance with the first embodiment of the invention.
Figure 2B:
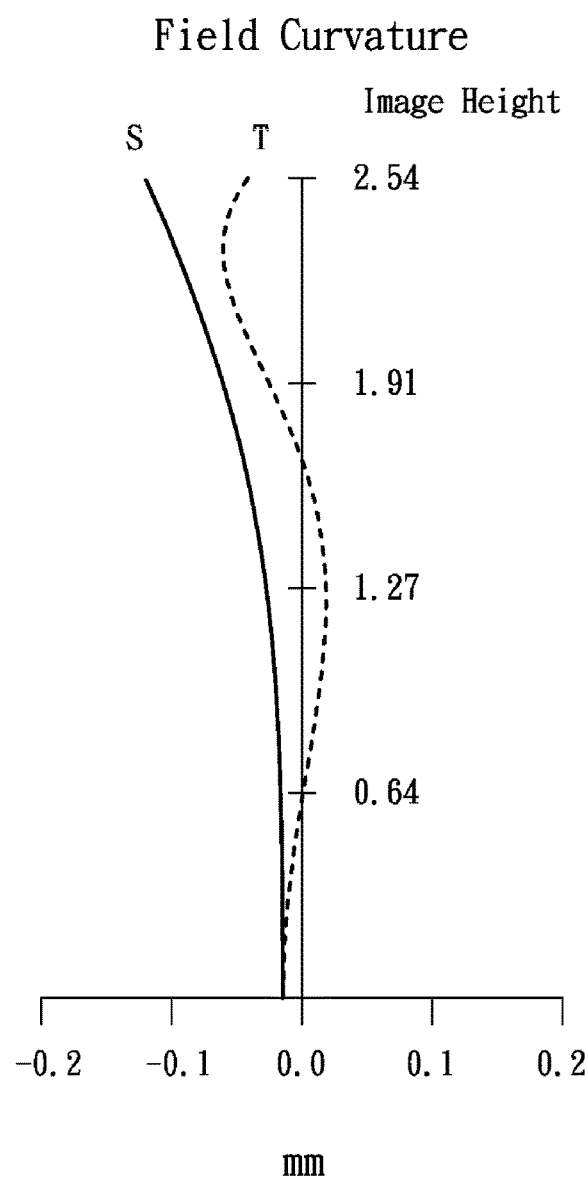
FIG. 2B is a astigmatic field curves diagram of a wide-angle lens in accordance with the first embodiment of the invention.
Figure 2C:
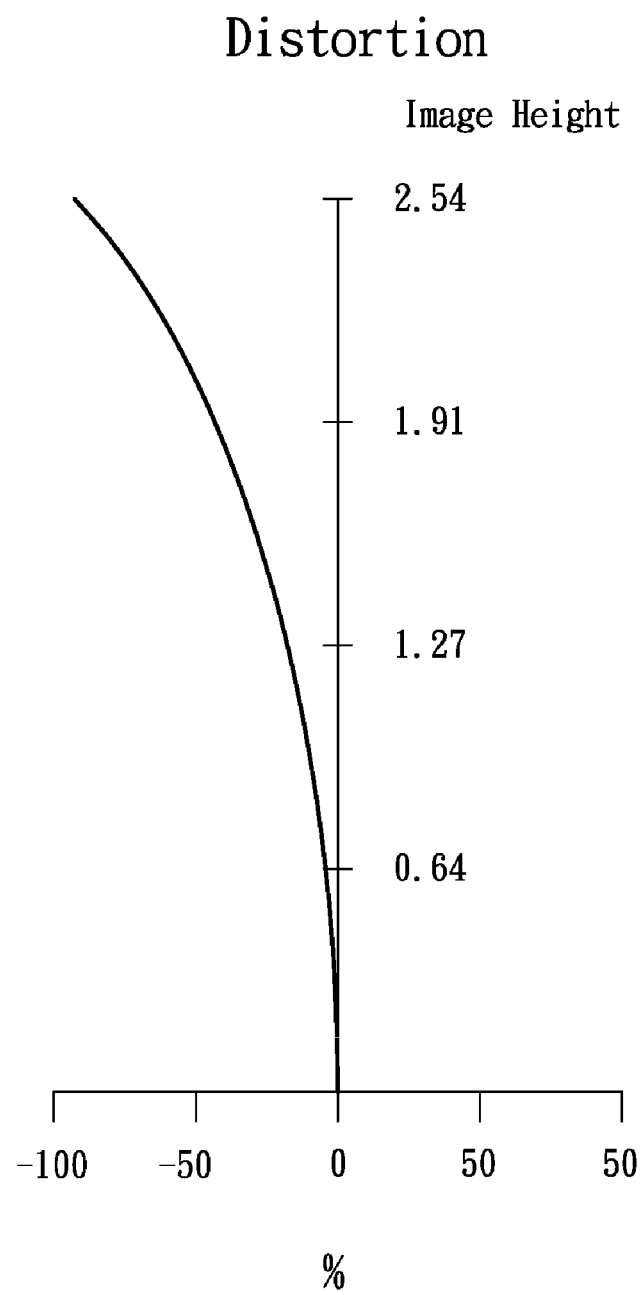
FIG. 2C is a distortion diagram of a wide-angle lens in accordance with the first embodiment of the invention.

By the above arrangements of the lenses and stop ST1, the wide-angle lens 1 of the first embodiment can meet the requirements of optical performance as seen in FIGS. 2A-2C, wherein FIG. 2A shows the longitudinal aberration diagram of the wide-angle lens 1 of the first embodiment, FIG. 2B shows the field curvature diagram of the wide-angle lens 1 of the first embodiment, FIG. 2C shows the distortion diagram of the wide-angle lens 1 of the first embodiment.

FIG. 2A shows that the longitudinal aberration in the wide-angle lens 1 of the first embodiment ranges between −0.02 mm and 0.00 mm for the wavelengths of 436.000 nm, 546.000 nm and 656.000 nm. FIG. 2B shows that the field curvature of tangential direction and sagittal direction in the wide-angle lens 1 of the first embodiment ranges between −0.13 mm and 0.02 mm for the wavelengths of 546.000 nm. FIG. 2C shows that the distortion in the wide-angle lens 1 of the first embodiment ranges between −100% and 0% for the wavelengths of 546.000 nm. It is obvious that the longitudinal aberration, the field curvature, the distortion and the lateral color of the wide-angle lens 1 of the first embodiment can be corrected effectively, thereby capable of obtaining good optical performance.

Figure 3:
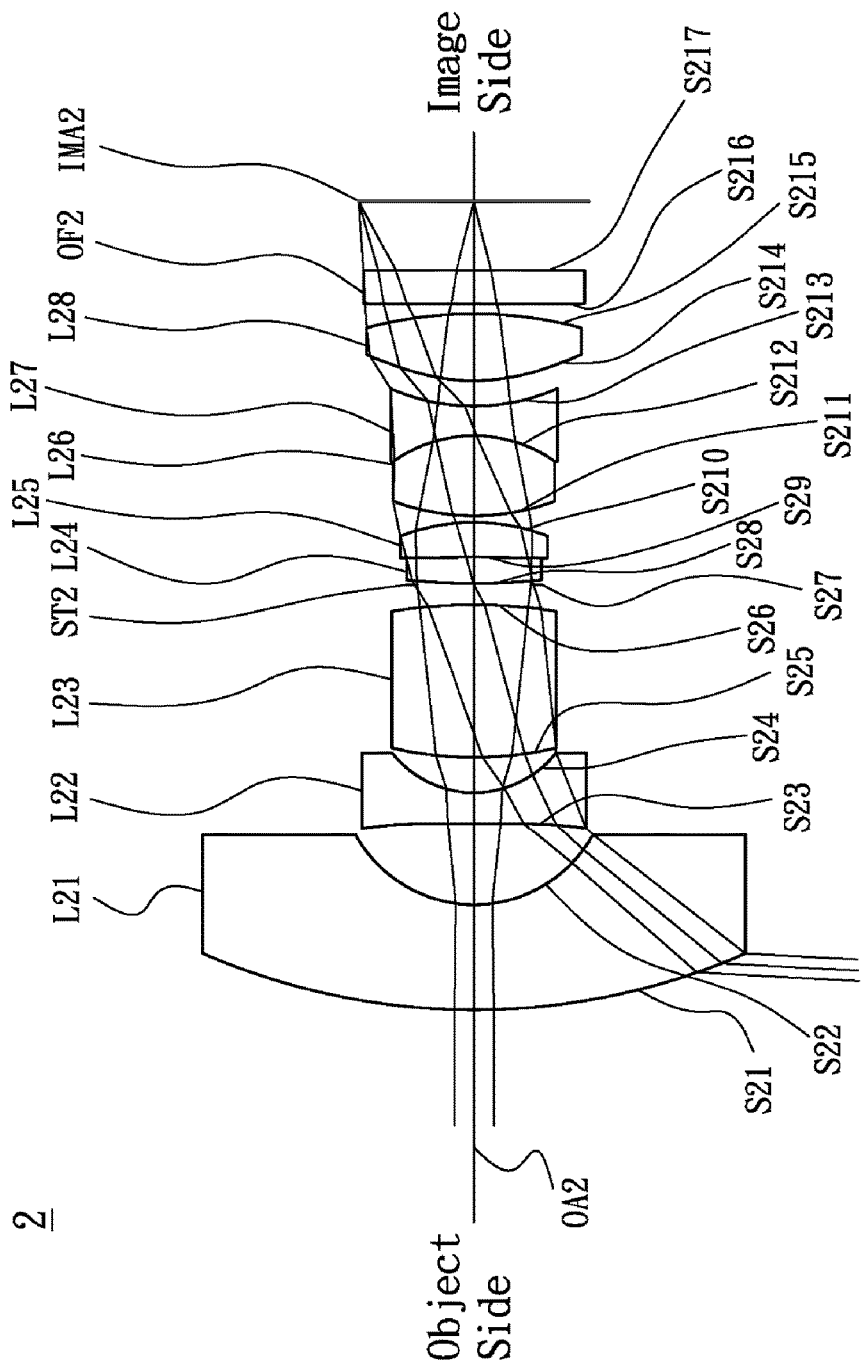
FIG. 3 is a lens layout and optical path diagram of a zoom lens at wide-angle end in accordance with a second embodiment of the invention.

Referring to FIG. 3, FIG. 3 is a lens layout and optical path diagram of a wide-angle lens 2 in accordance with a second embodiment of the invention The wide-angle lens 2, in sequence from an object side to an image side along an optical axis OA2, comprises a first lens L21; a second lens L22 including a concave surface facing the object side and having negative refractive power; a third lens L23 having positive refractive power; a fourth lens L24 including a convex surface and facing the object side; a fifth lens L25 having positive refractive power; a sixth lens L26 having positive refractive power; a seventh lens L27 having negative refractive power, and an eighth lens L28 having positive refractive power.

In the second embodiment of the wide-angle lens 2, the first lens L21 is made of glass material and with negative refractive power. The first lens L21 is a meniscus lens and the object side S21 of the first lens L21 is a spherical convex surface, and the image side S22 of the first lens L21 is a spherical concave surface. The second lens L22 is made of glass material and with negative refractive power. The second lens L22 is a biconcave lens and has an object side surface S23 and an image side surface S24, and both of which are aspherical. The third lens L23 is made of glass material and with positive refractive power. The third lens L23 is a biconvex lens and has an object side surface S25 and an image side surface S26, and both of which are spherical. The fourth lens L24 is made of glass material and with positive refractive power. The fourth lens L24 is a biconvex lens and has an object side surface S28 and an image side surface S29, and both of which are spherical. The fifth lens L25 is made of glass material and with positive refractive power. The fifth lens L25 is a meniscus lens and has an object side surface S29 and an image side surface S210, and both of which are spherical. The image side S29 of the fourth lens L24 and the object side S29 of the fourth lens L25 are cemented to form the surface S29. In other words, the fourth lens L24 and the fifth lens L25 are cemented to form a cemented lens. The sixth lens L26 is made of glass material and with positive refractive power. The sixth lens L26 is a biconvex lens and has an object side surface S211 and an image side surface S212, and both of which are spherical. The seventh lens L27 is made of glass material and with negative refractive power. The seventh lens L27 is a biconcave lens and has an object side surface S212 and an image side surface S213, and both of which are spherical. The image side S212 of the sixth lens L26 and the object side S212 of the seventh lens L27 are cemented to form the surface S212. In other words, the sixth lens L26 and the seventh lens L27 are cemented to form a cemented lens. The eighth lens L28 is made of glass material and with positive refractive power. The eighth lens L28 is a biconvex lens and has an object side surface S214 and an image side surface S215, and both of which are aspherical. The optical filter OF2 has an object side surface S216 and an image side surface S217, and both of which are plane.

In addition, the wide-angle lens 2 of the second embodiment at least satisfies one of the following conditions:

$$-110 \leq (R2_{71}-R2_{72})/(R2_{71}+R2_{72}) \leq -1 \quad (5)$$

$$-20 \leq f2_4/f2 \leq 20 \quad (6)$$

$$-30 \leq f2_{67}/f2 \leq -5 \quad (7)$$

$$5 \leq Vd2_4/Nd2_4 \leq 50 \quad (8)$$

Wherein $R2_{71}$ is a radius of curvature of the object side S212 of the seventh lens L27, $R2_{72}$ is a radius of curvature of the image side S213 of the seventh lens, $f2_4$ is an effective focal length of the fourth lens L24, f2 is an effective focal length of the wide-angle lens 2, $f2_{67}$ is an effective focal length of a cemented lens that is cemented the sixth lens L26 and the seventh lens L27, $Vd2_4$ is an Abbe number of the fourth lens L24, $Nd2_4$ is a refractive index of the fourth lens L24.

Due to the above design of the lenses and stop ST2, the wide-angle lens 2 is provided with characteristics of a larger field of view, miniaturization, high resolution and ability of resistance to environmental temperature changes.

Referring to TABLE 3, the optical specifications of the wide-angle lens 2 of the second embodiment. TABLE 3 shows that the effective focal length (f2), F-number, field of view (FOV) and total track length (TTL) is equal to 1.8287 mm, 2.0, 173.9° and 18.000 mm.

TABLE 3

Effective Focal Length (f2) = 1.8287 mm F-number = 2.0
FOV = 173.9° TTL = 18.000 mm

| Surface | Radius of Curvature (mm) | Thickness (mm) | Nd | Vd | Remark |
|---|---|---|---|---|---|
| S21 | 15.000 | 2.344 | 1.883 | 40.8 | The first lens L21 |
| S22 | 3.008 | 1.804 | | | |
| S23 | −679.159 | 0.698 | 1.589 | 61.2 | The second lens L22 |
| S24 | 2.294 | 0.770 | | | |
| S25 | 7.789 | 3.401 | 1.762 | 40.1 | The third lens L23 |
| S26 | −10.972 | 0.442 | | | |
| S27 | ∞ | 0.030 | | | Stop ST2 |
| S28 | 16.323 | 0.570 | 1.847 | 23.8 | The fourth lens L24 |
| S29 | −92.877 | 0.801 | 1.652 | 58.6 | The fifth lens L25 |
| S210 | −4.447 | 0.142 | | | |
| S211 | 5.147 | 1.783 | 1.652 | 58.6 | The sixth lens L26 |
| S212 | −3.076 | 0.651 | 1.847 | 23.8 | The seventh lens L27 |
| S213 | 4.618 | 0.565 | | | |
| S214 | 4.287 | 1.498 | 1.589 | 61.2 | The eighth lens L28 |
| S215 | −8.058 | 0.210 | | | |
| S216 | ∞ | 0.735 | 1.517 | 64.2 | Optical filter OF2 |
| S217 | ∞ | 1.555 | | | |

The aspheric surface sag z of each lens in TABLE 3 can be calculated by the following formula:

$$z = ch^2/\{1+[1-(k+1)c^2h^2]^{1/2}\} + Ah^4 + Bh^6 + Ch^8 + Dh^{10}$$

wherein c is curvature, h is the vertical distance from the lens surface to the optical axis, k is conic constant and A, B, C and D are aspheric coefficients.

In the wide-angle lens 2 of the second embodiment, the conic constant k and the aspheric coefficients A, B, C and D of each surface are shown in TABLE 4.

TABLE 4

| Surface | S23 | S24 | S214 | S215 |
|---|---|---|---|---|
| K | 0.0000E+00 | 0.0000E+00 | 0.0000E+00 | 0.0000E+00 |
| A | −2.3625E−03 | 8.3944E−04 | −5.5881E−03 | 1.3449E−03 |
| B | −2.0832E−04 | −9.3422E−04 | 4.7333E−04 | 2.2376E−04 |

TABLE 4-continued

| Surface | S23 | S24 | S214 | S215 |
|---|---|---|---|---|
| C | 2.8946E−05 | 0.0000E+00 | −4.8507E−05 | 3.3059E−05 |
| D | 0.0000E+00 | 0.0000E+00 | −5.9414E−06 | −7.0132E−06 |

For the wide-angle lens 2 of the second embodiment, the $R2_{71}$ is −3.07642 mm, the $R2_{72}$ is 4.61793 mm, the $f2_4$ is 16.2755 mm, the f2 is 1.8287 mm, the $f2_{67}$ is −11.84770 mm, the $Vd2_4$ is 23.8 and the $Nd2_4$ is 1.847. According to the above data, the following values can be obtained: $(R2_{71}-R2_{72})/(R2_{71}+R2_{72})=-4.991$, $f2_4/f2=8.900$, $f2_{67}/f2=-6.479$ and $Vd2_4/Nd2_4=12.876$, which satisfy the above condition (5)-(8).

Figure 4A:
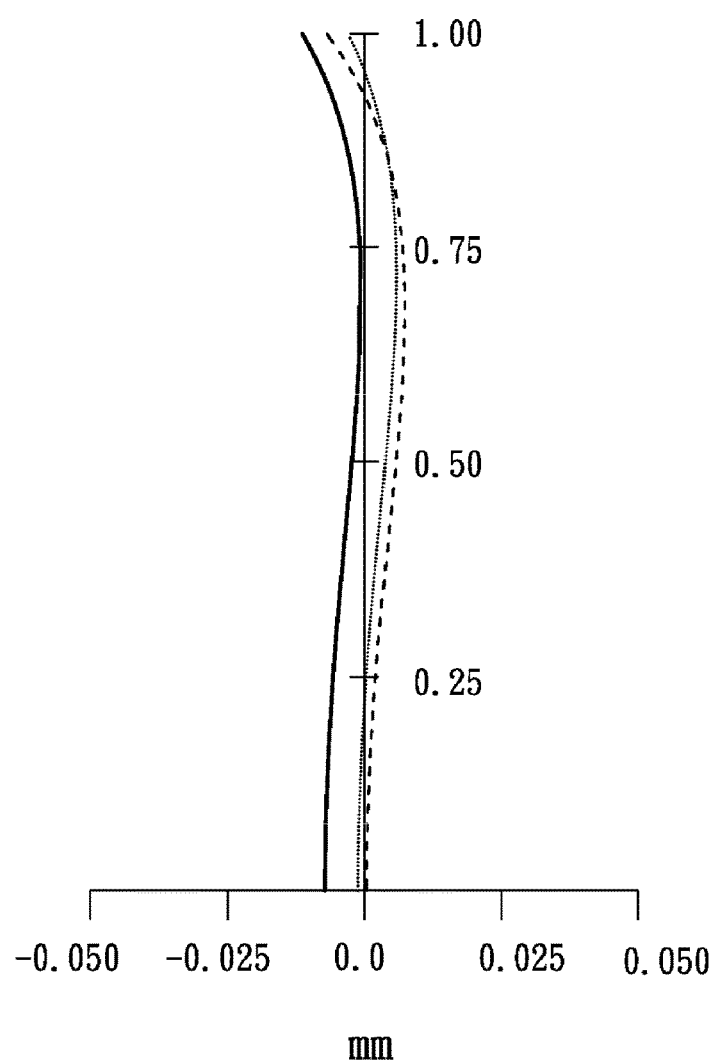
FIG. 4A is a longitudinal spherical aberration diagram of a wide-angle lens in accordance with the second embodiment of the invention.
Figure 4B:
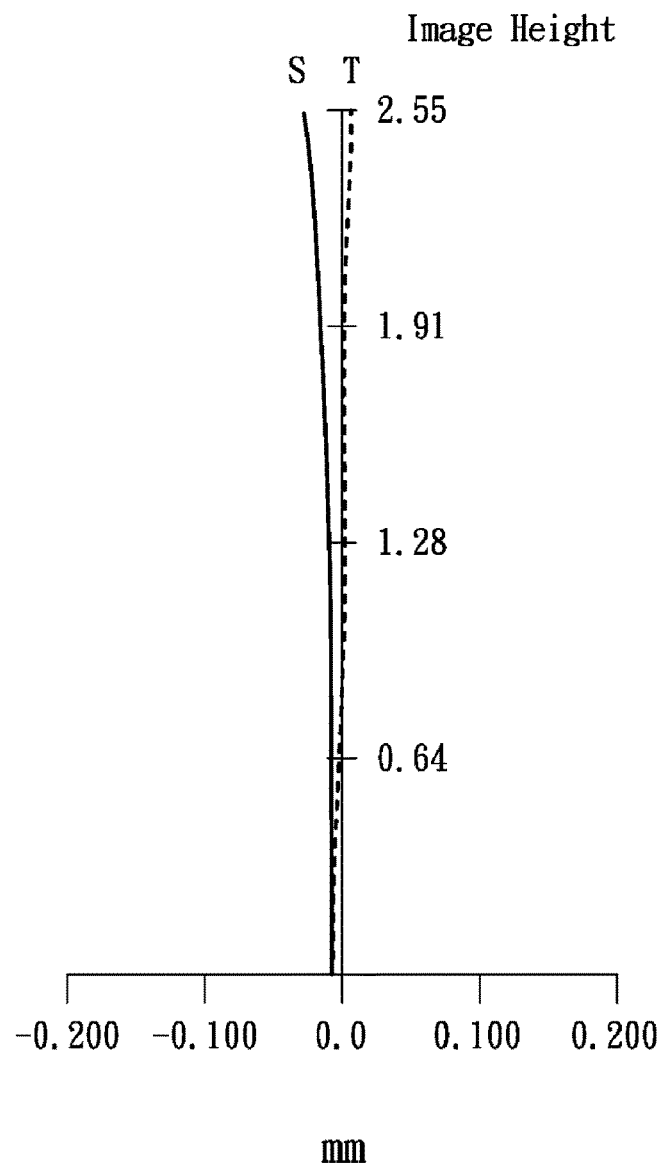
FIG. 4B is a astigmatic field curves diagram of a wide-angle lens in accordance with the second embodiment of the invention.
Figure 4C:
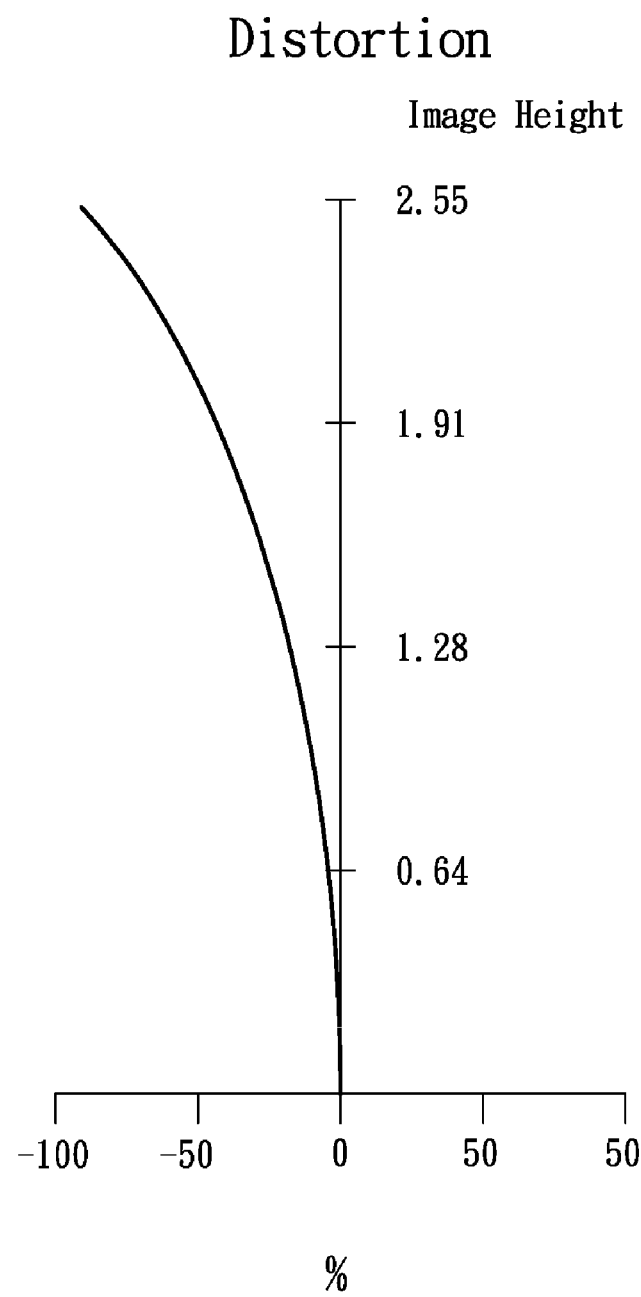
FIG. 4C is a distortion diagram of a wide-angle lens in accordance with the second embodiment of the invention.

By the above arrangements of the lenses and stop ST2, the wide-angle lens 2 of the second embodiment can meet the requirements of optical performance as seen in FIGS. 4A-4C, wherein FIG. 4A shows the longitudinal aberration diagram of the wide-angle lens 4 of the second embodiment, FIG. 4B shows the field curvature diagram of the wide-angle lens 2 of the second embodiment, FIG. 4C shows the distortion diagram of the wide-angle lens 2 of the second embodiment.

FIG. 4A shows that the longitudinal aberration in the wide-angle lens 2 of the second embodiment ranges between −0.015 mm and 0.008 mm for the wavelengths of 436.000 nm, 546.000 nm and 656.000 nm. FIG. 4B shows that the field curvature of tangential direction and sagittal direction in the wide-angle lens 2 of the second embodiment ranges between −0.04 mm and 0.01 mm for the wavelengths of 546.000 nm. FIG. 4C shows that the distortion in the wide-angle lens 2 of the second embodiment ranges between −100% and 0% for the wavelengths of 546.000 nm. It is obvious that the longitudinal aberration, the field curvature, the distortion and the lateral color of the wide-angle lens 2 of the second embodiment can be corrected effectively, thereby capable of obtaining good optical performance.

Figure 5:
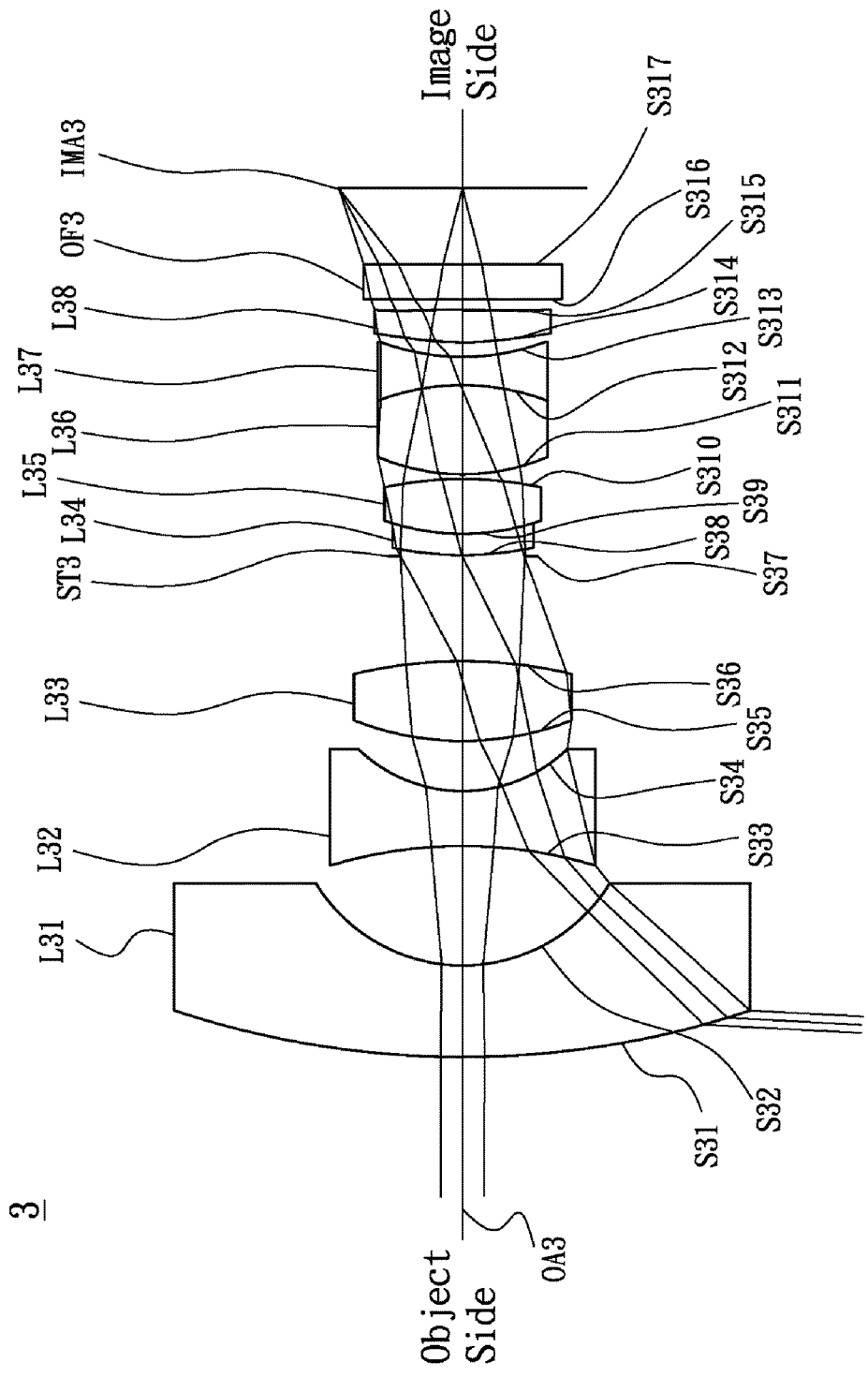
FIG. 5 is a lens layout and optical path diagram of a zoom lens at wide-angle end in accordance with a third embodiment of the invention.

Referring to FIG. 5, FIG. 5 is a lens layout and optical path diagram of a wide-angle lens 3 in accordance with a third embodiment of the invention The wide-angle lens 3, in sequence from an object side to an image side along an optical axis OA3, comprises a first lens L31; a second lens L32 including a concave surface facing the object side and having negative refractive power; a third lens L33 having positive refractive power; a fourth lens L34 including a convex surface and facing the object side; a fifth lens L35 having positive refractive power; a sixth lens L36 having positive refractive power; a seventh lens L37 having negative refractive power, and an eighth lens L38 having positive refractive power.

In the third embodiment of the wide-angle lens 3, the first lens L31 is made of glass material and with negative refractive power. The first lens L31 is a meniscus lens and the object side S31 of the first lens L31 is a spherical convex surface, and the image side S32 of the first lens L31 is a spherical concave surface. The second lens L32 is made of glass material and with negative refractive power. The second lens L32 is a biconcave lens and has an object side surface S33 and an image side surface S34, and both of which are aspherical. The third lens L33 is made of glass material and with positive refractive power. The third lens L33 is a biconvex lens and has an object side surface S35 and an image side surface S36, and both of which are spherical. The fourth lens L34 is made of glass material and with negative refractive power. The fourth lens L34 is a meniscus lens and the object side S38 of the fourth lens L34 is a spherical convex surface, and the image side S39 of the fourth lens L34 is a spherical concave surface. The fifth lens L35 is made of glass material and with positive refractive power. The fifth lens L35 is a biconvex lens and has an object side surface S39 and an image side surface S310, and both of which are spherical. The image side S39 of the fourth lens L34 and the object side S39 of the fifth lens L35 are cemented to form the surface S39. In other words, the fourth lens L34 and the fifth lens L35 are cemented to form a cemented lens. The sixth lens L36 is made of glass material and with positive refractive power. The sixth lens L36 is a biconvex lens and has an object side surface S311 and an image side surface S312, and both of which are spherical. The seventh lens L37 is made of glass material and with negative refractive power. The seventh lens L37 is a biconcave lens and has an object side surface S312 and an image side surface S313, and both of which are spherical. The image side S312 of the sixth lens L36 and the object side S312 of the seventh lens L37 are cemented to form the surface S312. In other words, the sixth lens L36 and the seventh lens L37 are cemented to form a cemented lens. The eighth lens L38 is made of glass material and with positive refractive power. The eighth lens L38 is a biconvex lens and has an object side surface S314 and an image side surface S315, and both of which are aspherical. The optical filter OF3 has an object side surface S316 and an image side surface S317, and both of which are plane.

In addition, the wide-angle lens 3 of the third embodiment at least satisfies one of the following conditions:

$$-110 \leq (R3_{71}-R3_{72})/(R3_{71}+R3_{72}) \leq -1 \qquad (9)$$

$$-20 \leq f3_4/f3 \leq 20 \qquad (10)$$

$$-30 \leq f3_{67}/f3 \leq -5 \qquad (11)$$

$$5 \leq Vd3_4/Nd3_4 \leq 50 \qquad (12)$$

Wherein $R3_{71}$ is a radius of curvature of the object side S312 of the seventh lens L37, $R3_{72}$ is a radius of curvature of the image side S313 of the seventh lens, $f3_4$ is an effective focal length of the fourth lens L34, f3 is an effective focal length of the wide-angle lens 3, $f3_{67}$ is an effective focal length of a cemented lens that is cemented the sixth lens L36 and the seventh lens L37, $Vd3_4$ is an Abbe number of the fourth lens L34, $Nd3_4$ is a refractive index of the fourth lens L34.

Due to the above design of the lenses and stop ST3, the wide-angle lens 3 is provided with characteristics of a larger field of view, miniaturization, high resolution and ability of resistance to environmental temperature changes.

Referring to TABLE 5, the optical specifications of the wide-angle lens 3 of the second embodiment. TABLE 5 shows that the effective focal length (f3), F-number, field of view (FOV) and total track length (TTL) is equal to 1.8325 mm, 2.0, 174.0° and 18.000 mm.

TABLE 5

Effective Focal Length (f3) = 1.8325 mm F-number = 2.0
FOV = 174.0° TTL = 18.000 mm

| Surface | Radius of Curvature (mm) | Thickness (mm) | Nd | Vd | Remark |
|---|---|---|---|---|---|
| S31 | 18.857 | 1.893 | 1.883 | 40.8 | The first lens L31 |
| S32 | 3.537 | 2.465 | | | |
| S33 | −9.352 | 1.146 | 1.589 | 61.2 | The second lens L32 |

TABLE 5-continued

Effective Focal Length (f3) = 1.8325 mm F-number = 2.0
FOV = 174.0° TTL = 18.000 mm

| Surface | Radius of Curvature (mm) | Thickness (mm) | Nd | Vd | Remark |
|---|---|---|---|---|---|
| S34 | 3.210 | 1.045 | | | |
| S35 | 6.193 | 1.640 | 1.762 | 40.1 | The third lens L33 |
| S36 | −9.786 | 2.189 | | | |
| S37 | ∞ | 0.030 | | | Stop ST3 |
| S38 | 6.981 | 0.426 | 1.847 | 23.8 | The fourth lens L34 |
| S39 | 4.818 | 1.141 | 1.652 | 58.6 | The fifth lens L35 |
| S310 | −7.641 | 0.100 | | | |
| S311 | 4.393 | 1.840 | 1.652 | 58.6 | The sixth lens L36 |
| S312 | −4.912 | 0.600 | 1.847 | 23.8 | The seventh lens L37 |
| S313 | 5.009 | 0.287 | | | |
| S314 | 5.940 | 0.671 | 1.589 | 61.2 | The eighth lens L38 |
| S315 | −57.668 | 0.224 | | | |
| S316 | ∞ | 0.735 | 1.517 | 64.2 | Optical filter OF3 |
| S317 | ∞ | 1.568 | | | |

The aspheric surface sag z of each lens in TABLE 5 can be calculated by the following formula:

$$z = ch^2 / \{1 + [1-(k+1)c^2h^2]^{1/2}\} + Ah^4 + Bh^6 + Ch^8 + Dh^{10}$$

wherein c is curvature, h is the vertical distance from the lens surface to the optical axis, k is conic constant and A, B, C and D are aspheric coefficients.

In the wide-angle lens 2 of the second embodiment, the conic constant k and the aspheric coefficients A, B, C and D of each surface are shown in TABLE 4.

TABLE 6

| Surface | S33 | S34 | S314 | S315 |
|---|---|---|---|---|
| K | 0.0000E+00 | 0.0000E+00 | 0.0000E+00 | 0.0000E+00 |
| A | 1.6638E−03 | 5.1206E−03 | −1.2209E−02 | −1.1785E−03 |
| B | −3.6203E−04 | −6.6474E−04 | 2.5597E−04 | 4.6837E−04 |
| C | 4.9340E−05 | 0.0000E+00 | −1.8258E−05 | 3.3444E−04 |
| D | 0.0000E+00 | 0.0000E+00 | 1.1118E−05 | −7.1455E−05 |

For the wide-angle lens 3 of the third embodiment, the $R3_{71}$ is −4.91214 mm, the $R3_{72}$ is 5.00930 mm, the $f3_4$ is −20.0008 mm, the f3 is 1.8325 mm, the $f3_{67}$ is −47.05990 mm, the $Vd3_4$ is 23.8 and the $Nd3_4$ is 1.847. According to the above data, the following values can be obtained: $(R3_{71}-R3_{72})/(R3_{71}+R3_{72}) = -102.115$, $f3_4/f3 = -10.915$, $f3_{67}/f3 = -25.681$ and $Vd3_4/Nd3_4 = 12.876$, which satisfy the above condition (9)-(12).

Figure 6A:
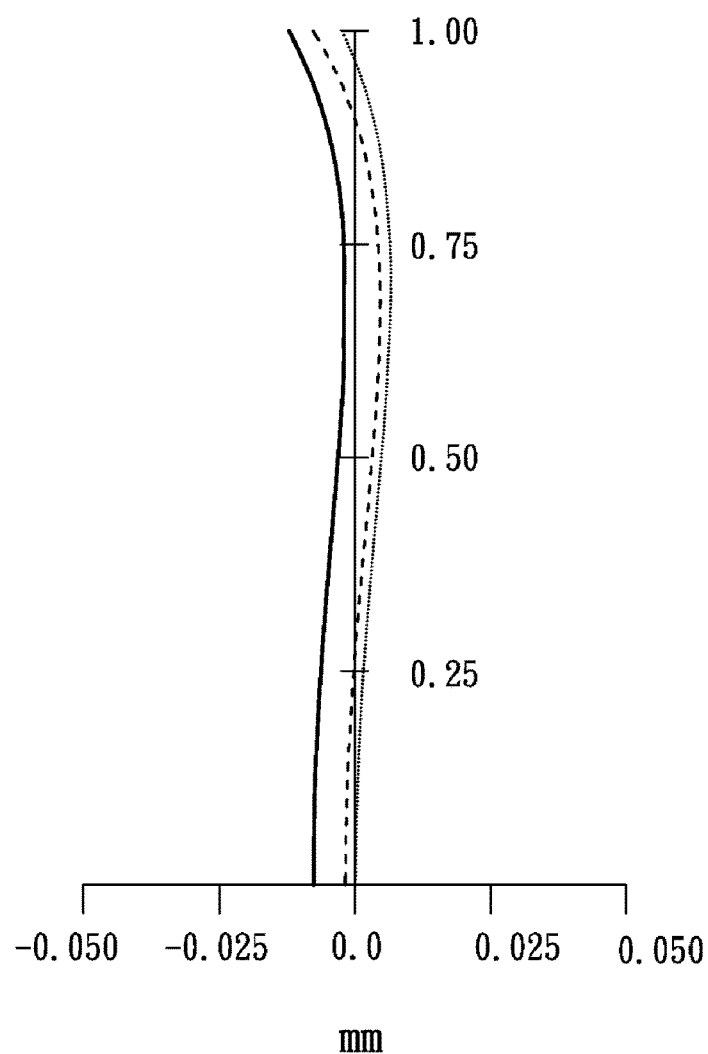
FIG. 6A is a longitudinal spherical aberration diagram of a wide-angle lens in accordance with the third embodiment of the invention.
Figure 6B:
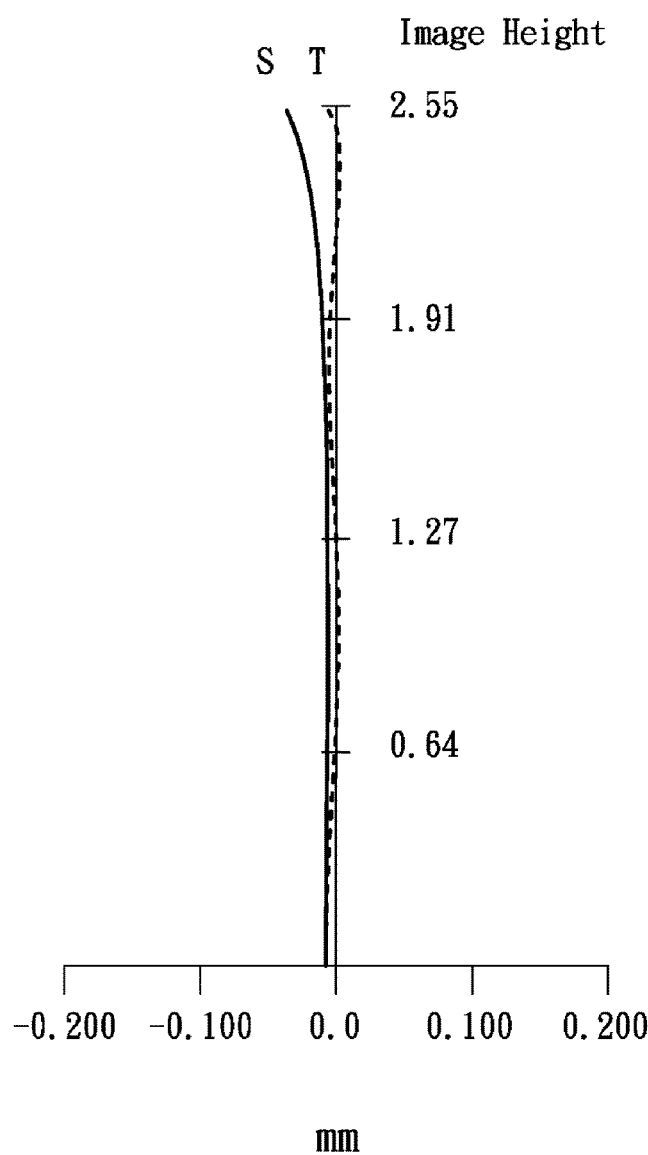
FIG. 6B is a astigmatic field curves diagram of a wide-angle lens in accordance with the third embodiment of the invention.
Figure 6C:
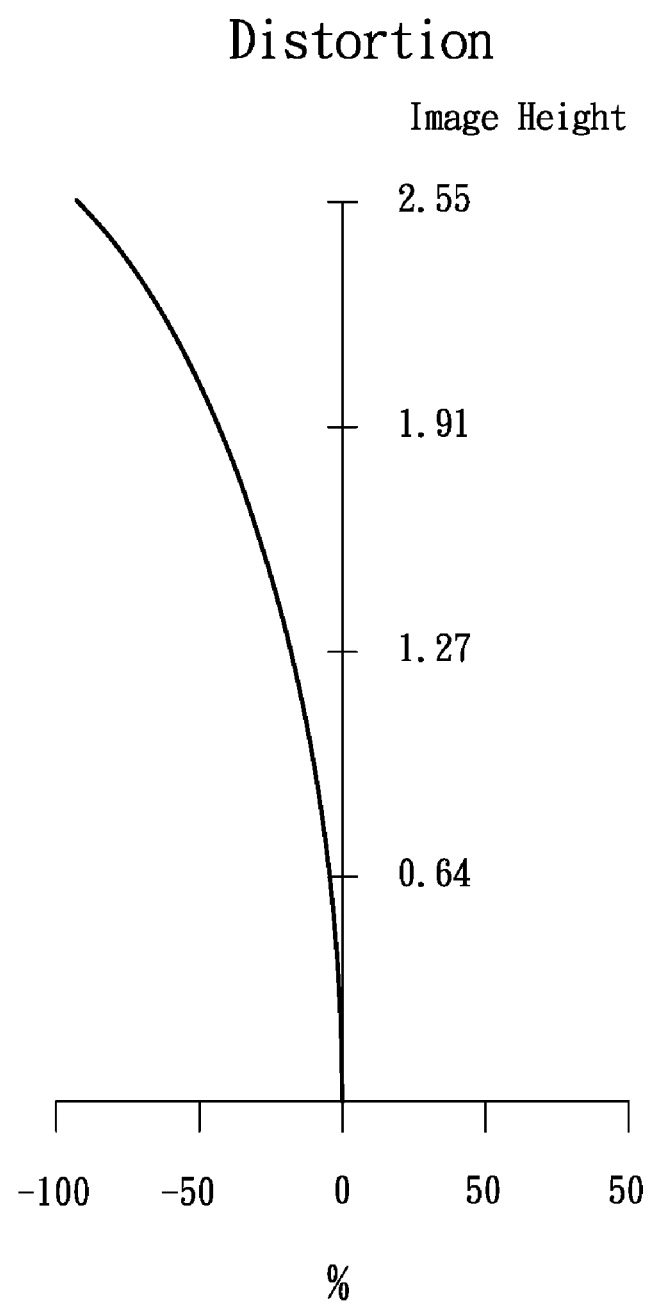
FIG. 6C is a distortion diagram of a wide-angle lens in accordance with the third embodiment of the invention.

By the above arrangements of the lenses and stop ST3, the wide-angle lens 3 of the third embodiment can meet the requirements of optical performance as seen in FIGS. 6A-6C, wherein FIG. 6A shows the longitudinal aberration diagram of the wide-angle lens 3 of the third embodiment, FIG. 6B shows the field curvature diagram of the wide-angle lens 3 of the third embodiment, FIG. 6C shows the distortion diagram of the wide-angle lens 3 of the third embodiment.

FIG. 6A shows that the longitudinal aberration in the wide-angle lens 3 of the third embodiment ranges between −0.014 mm and 0.007 mm for the wavelengths of 436.000 nm, 546.000 nm and 656.000 nm. FIG. 6B shows that the field curvature of tangential direction and sagittal direction in the wide-angle lens 3 of the third embodiment ranges between −0.04 mm and 0.01 mm for the wavelengths of 546.000 nm. FIG. 6C shows that the distortion in the wide-angle lens 3 of the third embodiment ranges between −100% and 0% for the wavelengths of 546.000 nm. It is obvious that the longitudinal aberration, the field curvature, the distortion and the lateral color of the wide-angle lens 3 of the third embodiment can be corrected effectively, thereby capable of obtaining good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wide-angle lens, in sequence from an object side to an image side along an optical axis, comprising:
   a first lens having negative refractive power;
   a second lens including a concave surface facing the object side and having negative refractive power;
   a third lens having positive refractive power;
   a fourth lens, having a negative refractive power, including a convex surface and facing the object side;
   a fifth lens having positive refractive power, wherein the fourth lens and the fifth lens are cemented to form a cemented lens;
   a sixth lens having positive refractive power;
   a seventh lens having negative refractive power, and
   an eighth lens is a biconvex lens having positive refractive power.

2. The wide-angle lens as claimed in claim 1, wherein the first lens is a meniscus lens and includes a convex surface facing the object side and a concave surface facing the image side.

3. The wide-angle lens as claimed in claim 1, wherein the second lens is a biconcave lens.

4. The wide-angle lens as claimed in claim 3, wherein the third lens is a biconvex lens.

5. The wide-angle lens as claimed in claim 3, wherein the sixth lens is a biconvex lens.

6. The wide-angle lens as claimed in claim 1, wherein the fifth lens includes a convex surface facing the image side.

7. The wide-angle lens as claimed in claim 1, wherein the seventh lens is a biconcave lens.

8. The wide-angle lens as claimed in claim 6, wherein the sixth lens and the seventh lens are cemented to form a cemented lens.

9. The wide-angle lens as claimed in claim 6, wherein the fourth lens satisfies:

$$-20 \leq f_4/f \leq 20$$

wherein $f_4$ is an effective focal length of the fourth lens, f is an effective focal length of the wide-angle lens.

10. The wide-angle lens as claimed in claim 7, wherein the sixth lens and the seventh lens are cemented to form a cemented lens.

11. The wide-angle lens as claimed in claim 1, wherein the sixth lens and the seventh lens satisfies:

$$-30 \leq f_{67}/f \leq -5$$

wherein $f_{67}$ is an effective focal length of a cemented lens that is cemented the sixth lens and the seventh lens, f is an effective focal length of the wide-angle lens.

12. The wide-angle lens as claimed in claim 1, wherein the fourth lens satisfies:

$$5 \leq Vd_4/Nd_4 \leq 50$$

wherein $Vd_4$ is an Abbe number of the fourth lens, $Nd_4$ is a refractive index of the fourth lens.

13. The wide-angle lens as claimed in claim 1, wherein the seventh lens satisfies:

$$-110 \leq (R_{71}-R_{72})/(R_{71}+R_{72}) \leq -1$$

wherein $R_{71}$ is a radius of curvature of the object side of the seventh lens, $R_{72}$ is a radius of curvature of the image side of the seventh lens.

14. The wide-angle lens as claimed in claim 1, wherein a stop and is interposed between the third lens and the fourth lens.

15. The wide-angle lens as claimed in claim 1, wherein the surfaces of the second lens, the third lens, the fourth lens, the fifth lens, the sixth lens, the seventh lens and the eighth lens at least one is an aspheric surface.

16. A wide-angle lens, in sequence from an object side to an image side along an optical axis, comprising:
  a first lens having negative refractive power;
  a second lens including a concave surface facing the object side and having negative refractive power;
  a third lens having positive refractive power;
  a fourth lens, having a negative refractive power, including a convex surface and facing the object side;
  a fifth lens having positive refractive power;
  a sixth lens having positive refractive power;
  a seventh lens having negative refractive power;
  an eighth lens is a biconvex lens having positive refractive power;
  wherein the fourth lens satisfies:

$$5 \leq Vd_4/Nd_4 \leq 50,$$

wherein $Vd_4$ is an Abbe number of the fourth lens, $Nd_4$ is a refractive index of the fourth lens.

17. A wide-angle lens, in sequence from an object side to an image side along an optical axis, comprising:
  a first lens having negative refractive power;
  a second lens including a concave surface facing the object side and having negative refractive power;
  a third lens having positive refractive power;
  a fourth lens, having a negative refractive power, including a convex surface and facing the object side;
  a fifth lens having positive retractive power, wherein the fourth lens and the fifth lens are cemented to form a cemented lens;
  a sixth lens having positive refractive power;
  a seventh lens having negative refractive power, and
  an eighth lens having positive refractive power;
  wherein the sixth lens and the seventh lens satisfies:

$$-30 \leq f_{67}/f \leq -5$$

wherein $f_{67}$ is an effective focal length of a cemented lens that is cemented the sixth lens and the seventh lens, f is an effective focal length of the wide-angle lens.

18. The wide-angle lens as claimed in claim 16, wherein the fourth lens satisfies:

$$-20 \leq f_4/f \leq 20$$

wherein $f_4$ is an effective focal length of the fourth lens, f is an effective focal length of the wide-angle lens.

19. The wide-angle lens as claimed in claim 16, wherein the seventh lens satisfies:

$$-110 \leq (R_{71}-R_{72})/(R_{71}+R_{72}) \leq -1$$

wherein $R_{71}$ is a radius of curvature of the object side of the seventh lens, $R_{72}$ is a radius of curvature of the image side of the seventh lens.

* * * * *